(12) United States Patent
Gordon (10) Patent No.: US 9,531,423 B2
(45) Date of Patent: Dec. 27, 2016

(54) HANDLER FOR ELECTRONIC HANDHELD DEVICES

(71) Applicant: Bruce Gordon, Mississauga (CA)

(72) Inventor: Bruce Gordon, Mississauga (CA)

( * ) Notice: Subject to any disclaimer, the term of this patent is extended or adjusted under 35 U.S.C. 154(b) by 0 days.

(21) Appl. No.: 14/715,749

(22) Filed: May 19, 2015

(65) Prior Publication Data

US 2016/0344437 A1  Nov. 24, 2016

(51) Int. Cl.
  *H04M 1/00* (2006.01)
  *H04B 1/3888* (2015.01)
  *H04W 88/02* (2009.01)

(52) U.S. Cl.
  CPC .......... *H04B 1/3888* (2013.01); *H04W 88/02* (2013.01)

(58) Field of Classification Search
  CPC .............................. H04M 1/0202; H04M 1/04
  USPC ............ 455/575.8, 575.1, 567, 171.1, 181.1, 455/556.1
  See application file for complete search history.

(56) References Cited

U.S. PATENT DOCUMENTS

| | | | |
|---|---|---|---|
| 8,528,798 B2 | 9/2013 | Chen | |
| 2010/0032462 A1 | 2/2010 | Cameron | |
| 2010/0222118 A1 | 9/2010 | Interdanato | |
| 2012/0267402 A1 | 10/2012 | Beatty | |
| 2013/0148271 A1* | 6/2013 | Huang | H04B 1/3888 361/679.01 |

* cited by examiner

*Primary Examiner* — Joseph Arevalo
(74) *Attorney, Agent, or Firm* — Nasser Ashgriz; UIPatent Inc.

(57) ABSTRACT

A handle for mobile phone attached to a mobile phone or mobile phone case comprises of an elastic strip having a finger sleeve on one end of the elastic strip unit to receive a finger of a user to improve the method of handling the mobile device in a secure and comfortable position and a complementary accessory to fasten the device on arm, wrist or neck of a user in order to have a secure holding for said device. The index finger is inserted into the finger sleeve of the elastic strip and enables the user to hold the mobile phone free without gripping and without dropping. In this case other fingers can be used for other activities such as holding a cup, or the handle in the bus, and thumb can be used for texting or using the touch display of the mobile phone. The elastic handler allows the user's finger to be freely bending and join the other fingers in activities.

3 Claims, 14 Drawing Sheets

HANDLER FOR ELECTRONIC HANDHELD DEVICES

FIELD OF THE INVENTION

The present invention relates generally to a handler for electronic hand held devices.

BACKGROUND OF THE INVENTION

Electronic devices such as smart phones are used every day by millions of people. Many users require continuous access to their mobile phones to talk, text, read, listen to music, etc., while performing other tasks. Therefore, a case that will allow one to have easy handling to a mobile phone is desirable.

The prior art discloses mobile cases that can be attached to other wearable accessories, such as a wristband or an armband. There are also clips that connect a mobile phone case to belts, necklaces, etc. These accessories are usually bulky and unwieldy to use. The prior art also introduce mobile cases which have sleeves to hold the mobile phone with a finger. These finger holding cases have a fixed position for the insertion of a finger and are not adjustable in size and location.

There remains a need to have a handler for handheld electronic devices that allows for secure and comfortable holding of said device while the user performs other tasks.

SUMMARY OF THE INVENTION

The present invention is a handler for mobile phones and small portable electronic devices for improved security and hand free operation. The present handler for a mobile device comprises of a sleeve, sized to receive a user's finger, permitting the user to operate the device with other fingers. It comprises of strips of elastic hook and loop material, such as Velcro that are attached to the rear side of a mobile device or a mobile device case. Velcro comprises of two parts, one part comprising of loops and the other part comprising of hooks. The loops catch on the hooks when they are pressed together, forming a strong but detachable attachment. The elastic Velcro strips rest flat along the back side of the case when not in use.

The present handler comprises of several strips of hook and loop elastic material, which can be removably attach to each other forming various and flexible ways to handle a mobile device. The handler comprises of a first elastic strip comprising of engagement loops, said strip having a length and a width sized to fit on the rear side of a mobile phone case. Said first elastic strip being attached from end to the upper back side of the case. The other end of the strip being folded and attached onto its own back side, while leaving a sleeve to receive a finger of a user typically although not necessarily the user's index or middle finger. The handler further comprises of a second strip comprising of hooks to engage with the loops of the first strip. The second strip being attached to the lower back side of a mobile case. The first strip can be removably attached to the second strip fixed at the back side of the mobile case.

The elasticity of the strip provides one aspect of creating a convenient fit of the finger and free movement, rotatable or to the sides and is operable to stretch and allow the finger to create a convenient grip. Said first strip of the handler for mobile device is attached from one end to the rear side of the mobile case and is standing free. This allows the strip to move free.

The present handler further having a third strip of elastic Velcro for fastening the mobile phone on one's arm or wrist, thereby enabling a user to carry the device hands free.

Said third strip can be worn as a wristband or carried separately in one's pocket and used whenever needed. The third strip, attaches from middle to the second strip of the case and the first strip attaches thereon, so that the third strip sandwiches between the first and second strip. There is hook and loop fasteners at the ends of the third strip to temporarily and removable joining the two ends of the strip together around the wrist or arm of the user. The elastic Velcro enables the strip to be fit on any size of wrist or arm easily.

The present handler further having a ring, designed to receive a neck or hip strap. Said ring being attached to the second strip of the case.

It is an object of the present invention to provide multi-functional handling for a mobile device.

It is another object of the present invention to provide a handler to secure a mobile phone to user's finger, thereby; the user may perform other activities such as jugging, driving, typing, drinking and other.

It is another object of the present invention to provide a flexible and detachable finger loop to securely hold a mobile device and use other fingers to operate the phone. The prior art devices with finger loops are designed for use with either the right hand or the left hand, and are not flexible. The advantage of the present invention is that it can be used by either hand.

It is another object of the present invention to provide a handle to attach the phone on one's arm or wrist for hands free operation.

Another object of the present invention is to provide a handler for a mobile device that is flexible enough to allow the user to hold the device in a variety of ways.

It is another object of the present invention to provide a device that allows one to hang a mobile phone on his or her neck or hip securely.

It is another object of the present invention to use the handler as a mobile stand.

Other objects, features, and advantages of the present invention will be readily appreciated from the following description. The description makes reference to the accompanying drawings, which are provided for illustration of the preferred embodiment. However, such embodiments do not represent the full scope of the invention.

In accordance with the preferred embodiment of the invention, there is a package of securing system for hand held device, which is mounted on a case is disclosed.

BRIEF DESCRIPTION OF THE DRAWINGS

Embodiments herein will hereinafter be described in conjunction with the appended drawings provided to illustrate and not to limit the scope of the claims, wherein like designations denote like elements, and in which:

FIG. 1 (a-b), (a) is a perspective view of a mobile case according to an embodiment of the present invention, and (b) is a back view of said mobile case and the handler device attached thereon, according to an embodiment of the present invention;

FIG. 2 (a-b), (a) is a perspective view of the present invention; and (b) is a side view of the present invention;

FIG. 13 (a-b), (a) is a side view of the present invention, used as a mobile phone stand; and (b) is a front view of a mobile device on the mobile phone stand.

DETAILED DESCRIPTION OF PREFERRED EMBODIMENTS

In accordance with a preferred embodiment of the invention a handler for electronic handheld device is illustrated which is attached to a mobile case.

Figure 1:
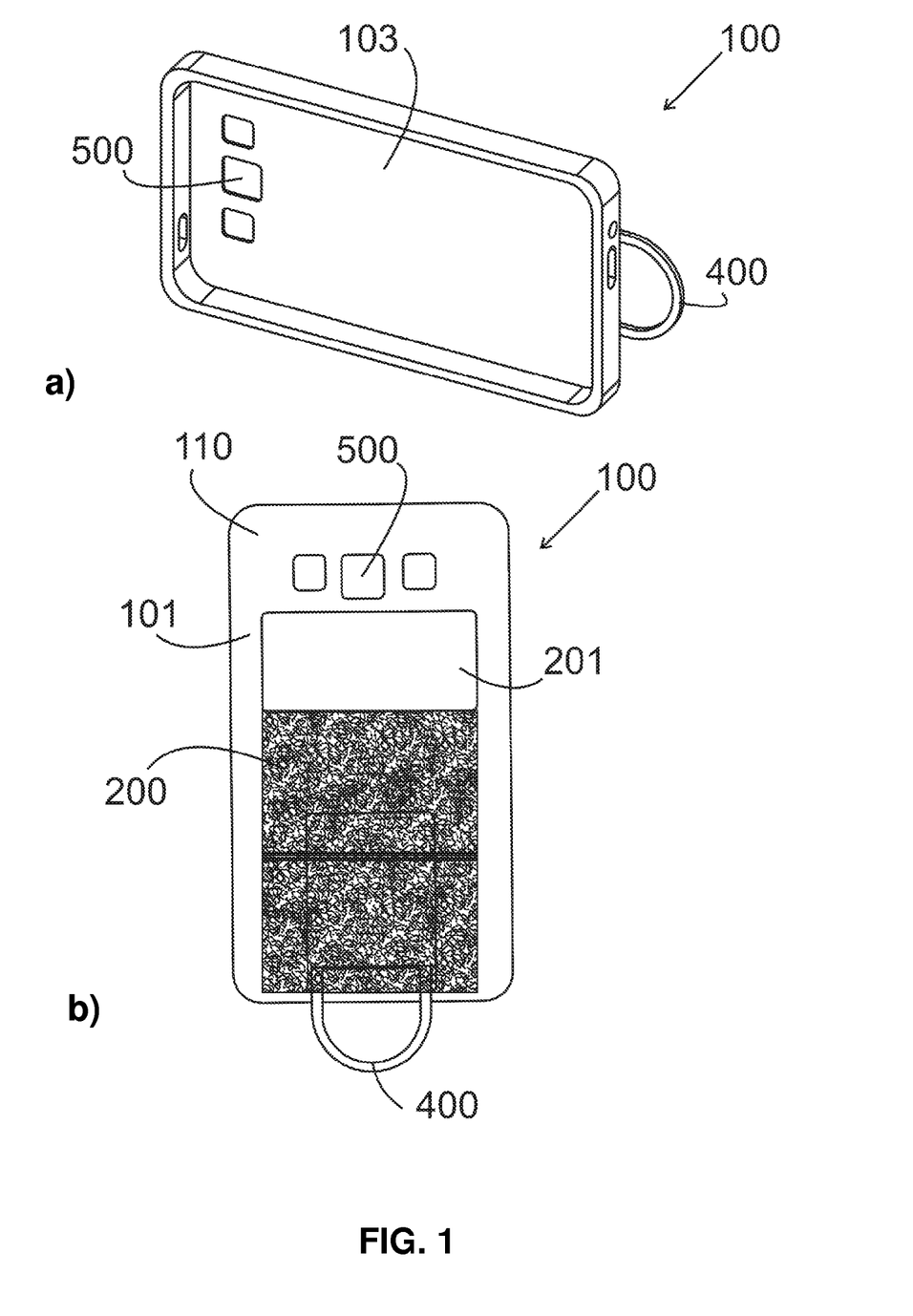

According to FIG. 1 (a-b), FIG. 1(a) is a mobile case 100 having an interior side 103 and an exterior side 110 and camera apertures 500 on the top 101 of the rear side 110.

As shown in FIG. 1 (a-b), FIG. 1(b) is a rectangular strip 200 having a length and a width to fit on the rear side 110 of the mobile phone case 100 and is made of elastic Velcro. Velcro or similar materials comprise of two parts, hooks and loops, which fasten to each other once pressed together. Said first strip 200 is attached (sewn, adhered, etc.) from one end 201 to the top of the rear side 101 of the mobile case 100 underneath the camera apertures 500.

Figure 2:
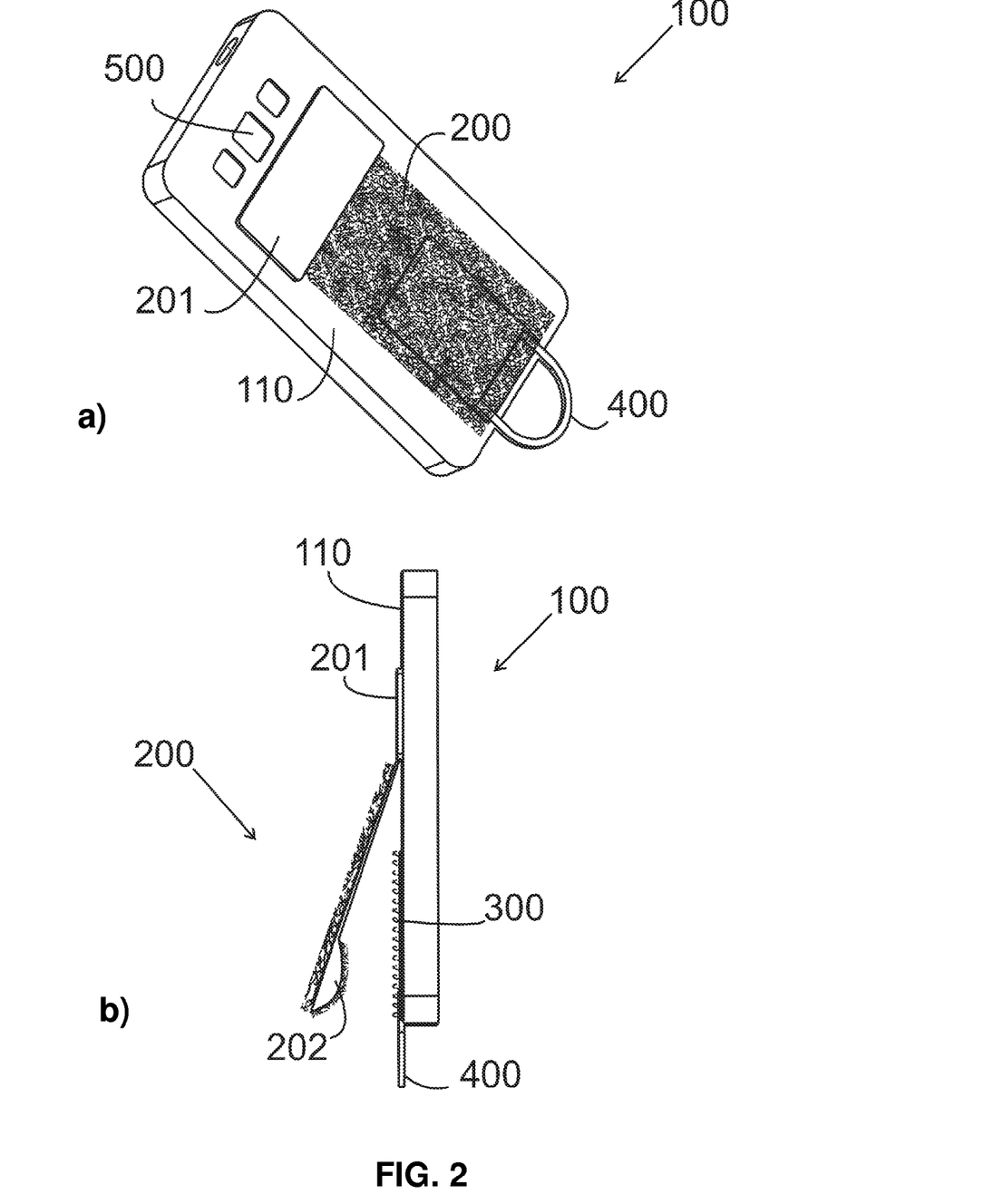

FIGS. 2 (a-b), 3 and 4 illustrate one embodiment of the attachment means of the elastic Velcro to the rear side of the mobile case 110. Referring to FIG. 2 (b), one side of the first strip 201 is attached to the upper side of the mobile case 101 and the other side is standing free. However, the first strip is folded and stitched to build a sleeve or finger receptacle portion 202. The sleeve is sized to fit user's finger, typically, although not necessarily, the user's index or middle finger.

Again as shown in FIG. 2 (a-b), the top part 201 of the first strip 200 is attached to the rear side of the mobile case 110. By attaching only one side of the first strip 200 the user has the ability to easily rotate the mobile device while held by a finger.

Figure 6:
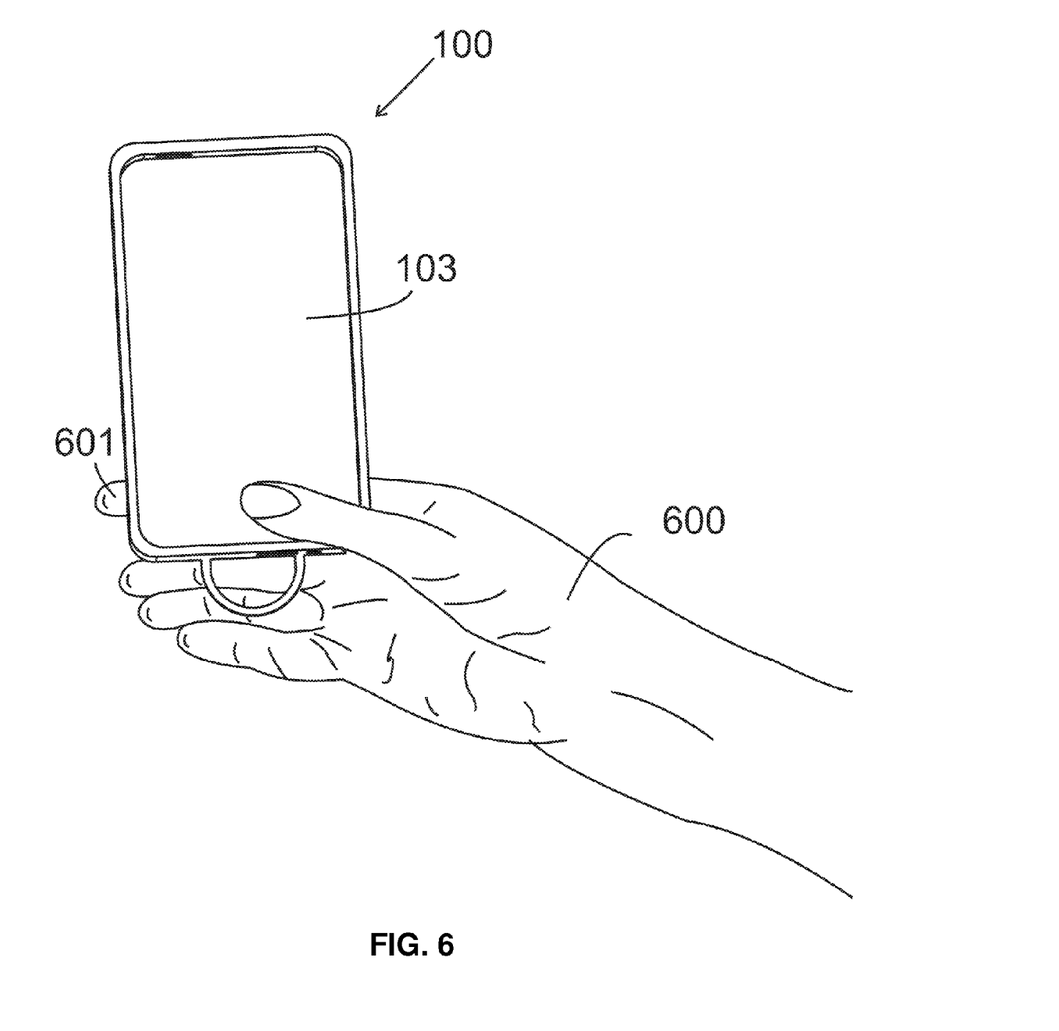
FIG. 6 illustrates a perspective front view of the present invention having the handler unit attached to the back of the mobile case and a user's index finger extending into the finger sleeve.
Figure 7:
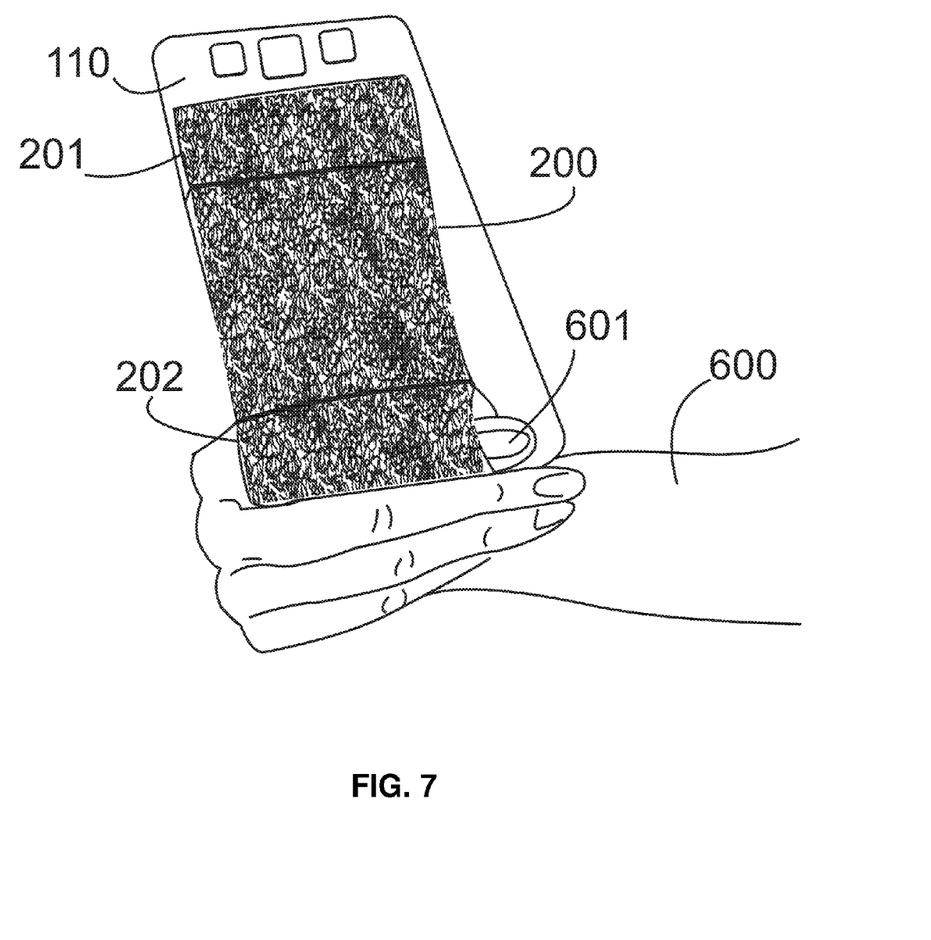
FIG. 7 illustrates a perspective view of the back side of the present invention having the handler unit attached thereon and user's index finger extending into the finger sleeve.

FIGS. 6-7 show that once the index finger 601 of user's hand 600 is inserted into the finger sleeve 202, the case 100 can be held without grabbing it. In this case, other fingers can be used for other activities such as holding a cup, or holding the handle in the bus, and thumb can be used for texting or using the touch display of the mobile phone. The mobile phone can be also flipped behind the index finger 601 whenever is not in use. The elastic strip allows the user's index finger 601 to be freely bending and join the other fingers in activities.

Figure 3:
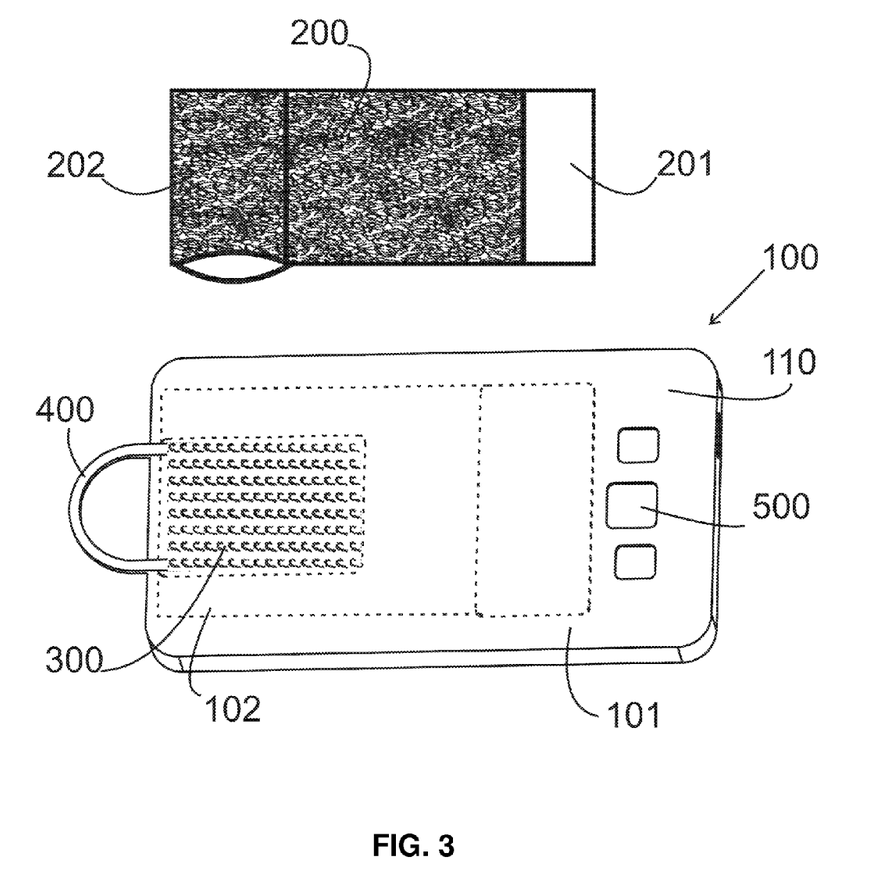
FIG. 3 is an exploded perspective view showing the method of attachment of the handler to the mobile phone case.
Figure 4:
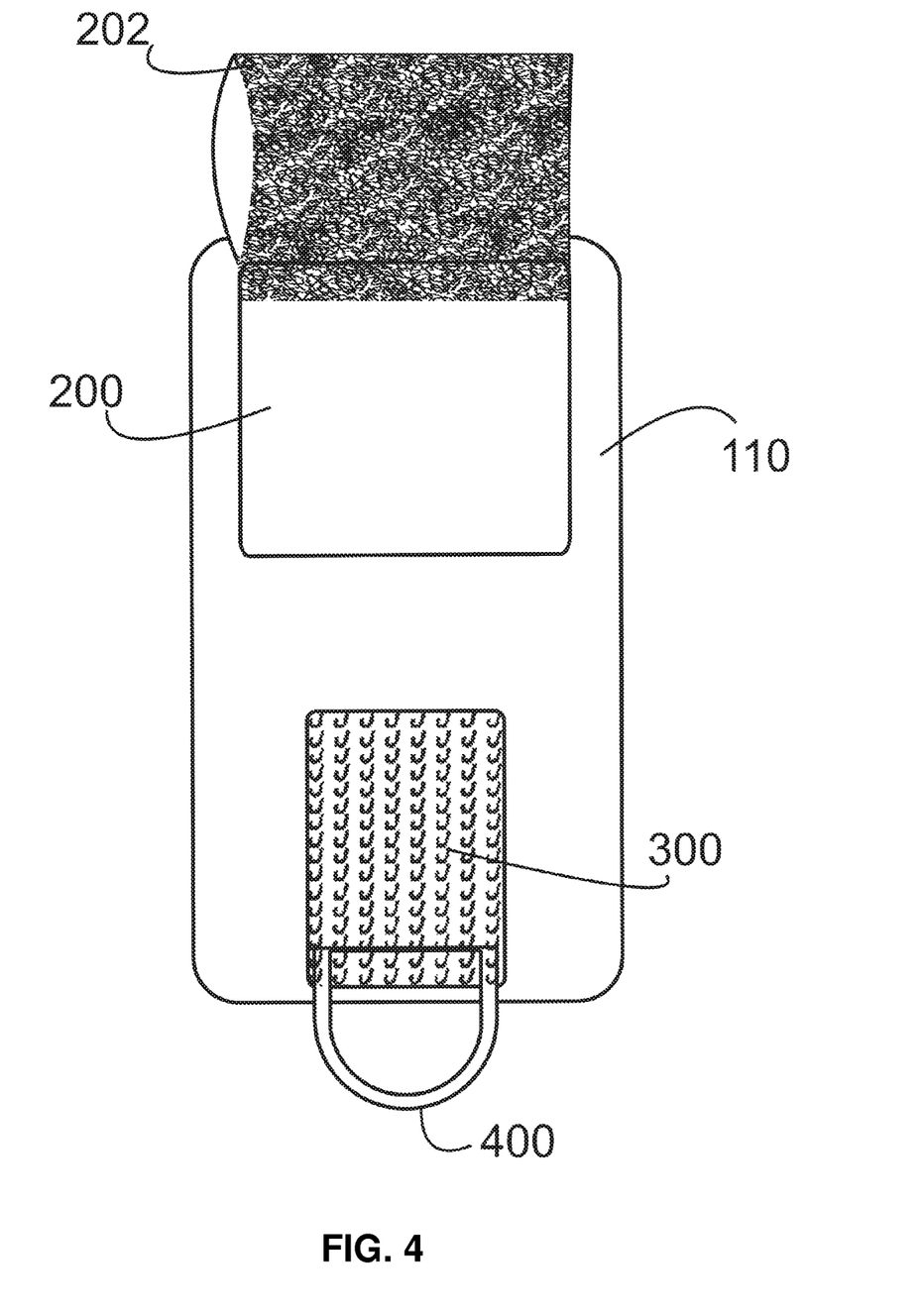
FIG. 4 shows the back side of the mobile case showing the handler flipped up.

Referring to FIG. 3 and FIG. 4, a second strip 300 is attached to the bottom 102 of the back of the mobile case 100. The second strip 300 is preferably made of Velcro hook or similar material (sewn, glued or other attaching means) and allows the first strip 200 of the present invention rest substantially flat on the back side 110 of the case 100 when is not in use.

FIG. 3 shows the mechanism of how the first strip 200 of the present invention attaches to the back 110 of the mobile case 100.

As shown in FIGS. 1-5, the first strip 200 may be attached to the back 110 of the mobile case 100 by adhesive or sewing means.

Figure 5:
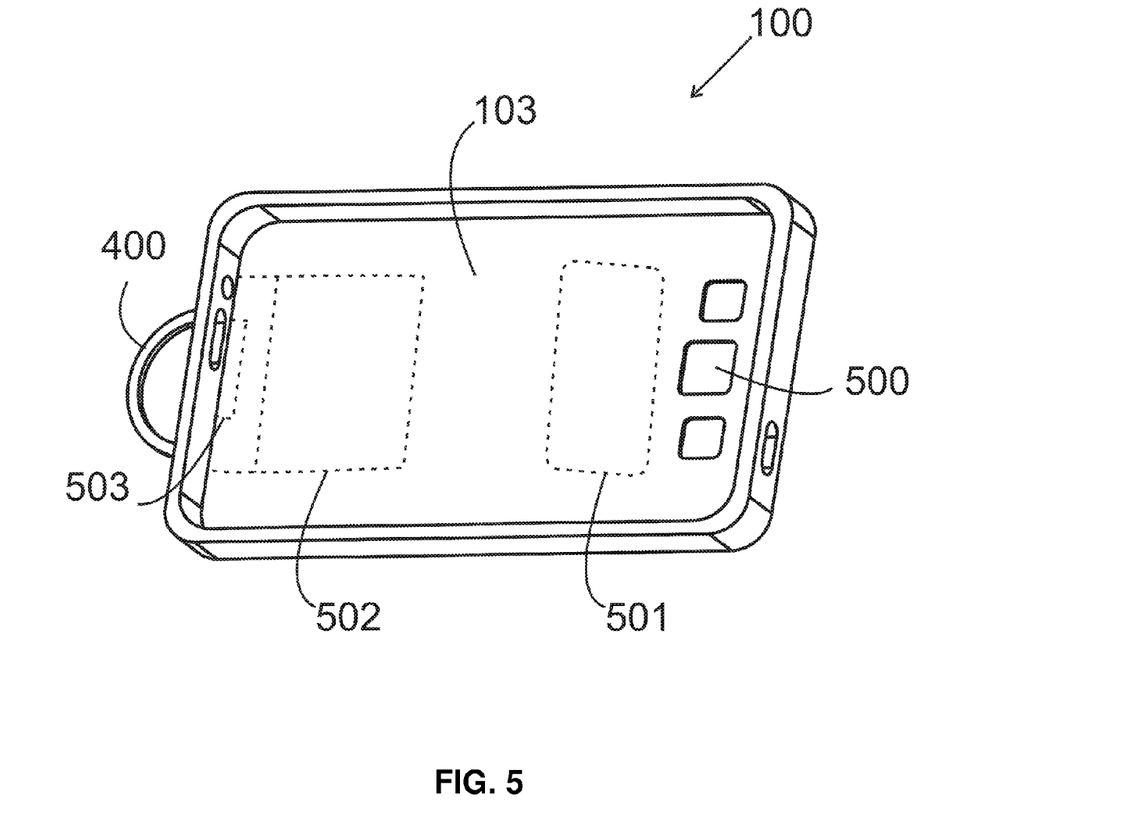
FIG. 5 is a perspective view of the interior side of the mobile case showing the sewn strips according to the exemplary embodiment of the present invention.

FIG. 5 shows the interior part 103 of the mobile case 100 with the stitches areas of an exemplary embodiment of the present invention. 501 is the stitches line of the attached area of the first strip 200, 502 is the stitches line of the second strip 300 and 503 is the stitches line of the ring 400 attachment.

As illustrated in FIGS. 2 and 3 the sleeve 202 of the first strip 200 having the ability to stand non-attached, so the finger inserted into the sleeve can move and bend freely in any direction.

The present handler for mobile phone device having several complementary accessories for fastening the mobile phone on the arm or the wrist of the user for hands free operation.

Figure 8:
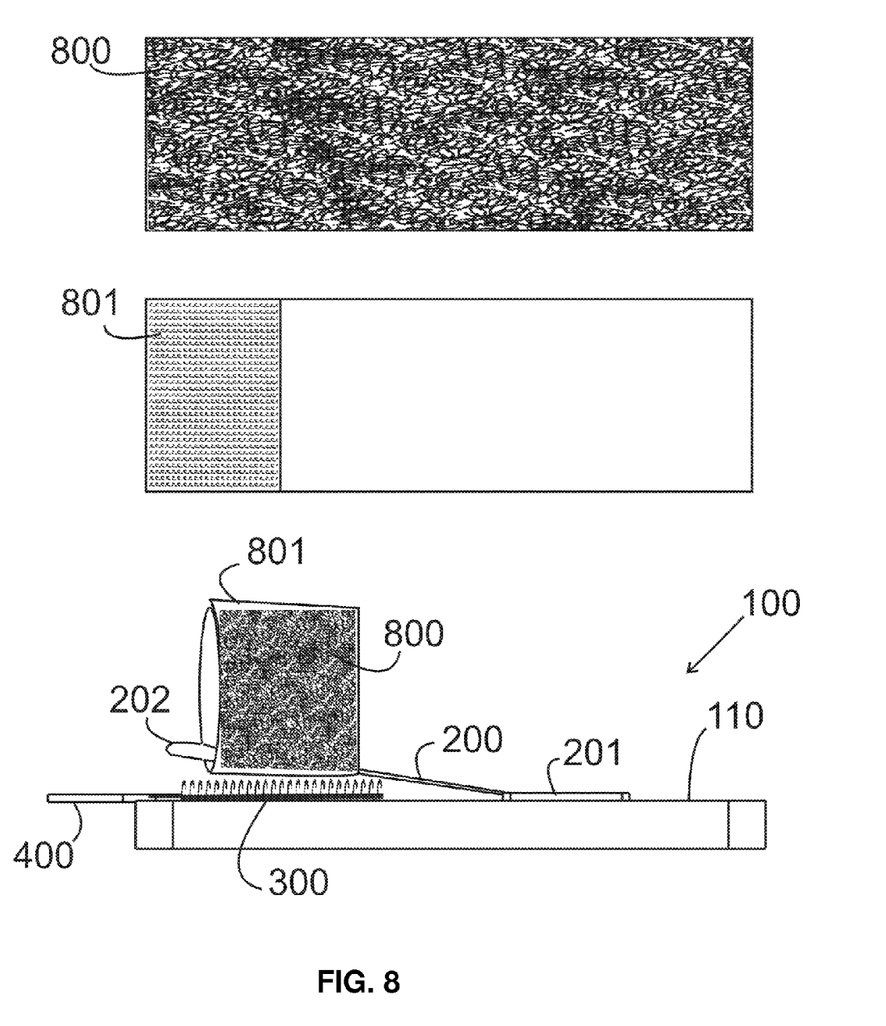
FIG. 8 is a front and rear view of the complementary accessory for the present invention to provide an armband and wristband.
Figure 9:
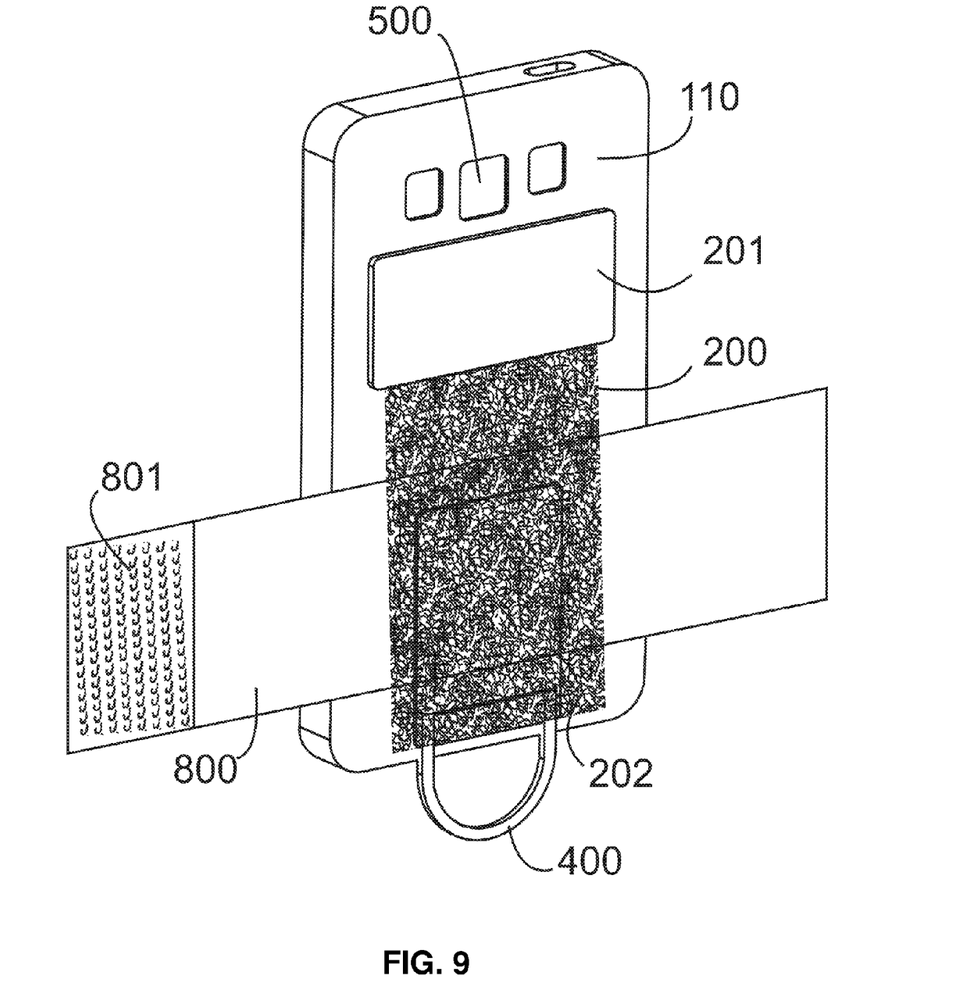
FIG. 9 illustrates the method of attachment of the complementary armband and wristband on the mobile case.

Referring to FIG. 8 a rectangular Velcro strip 800 having a length and a width to be fasten on the user's arm or wrist is disclosed. Said third strip 800 attaches from the middle to the second strip 300 to the back side 110 of the case 100 and the first strip 200 attaches thereon, so that the third strip 800 sandwiches between the second strip 300 and the first strip 200. Hook and loop fasteners 801 are disposed at the end of the third strip 800 to temporarily and removable join the two ends of the strip together around the wrist or arm of the user. The elastic Velcro enables the strip to fit on any size wrist or arm and it can be worn as a wristband or carried separately in one's pocket and used whenever needed.

Figure 10:
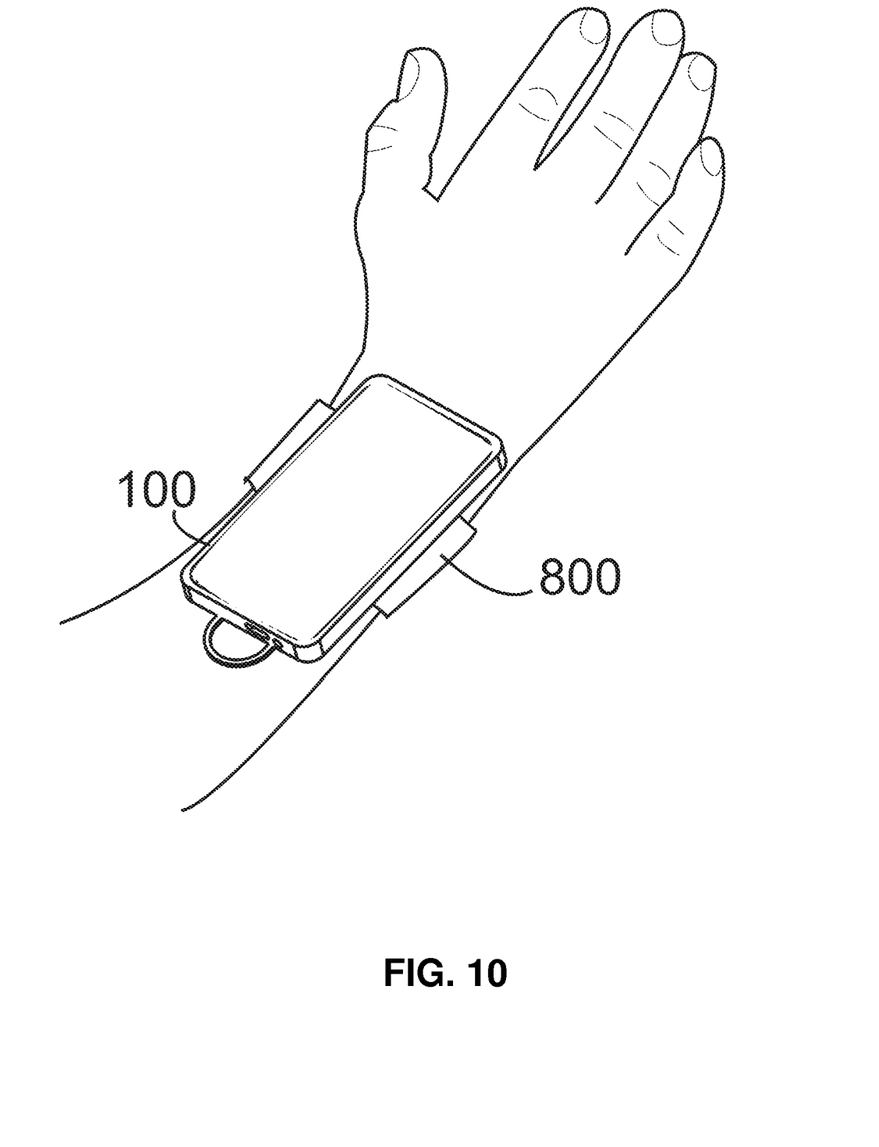
FIG. 10 illustrates the complementary attachment of the present invention connected to the user's wrist.
Figure 11:
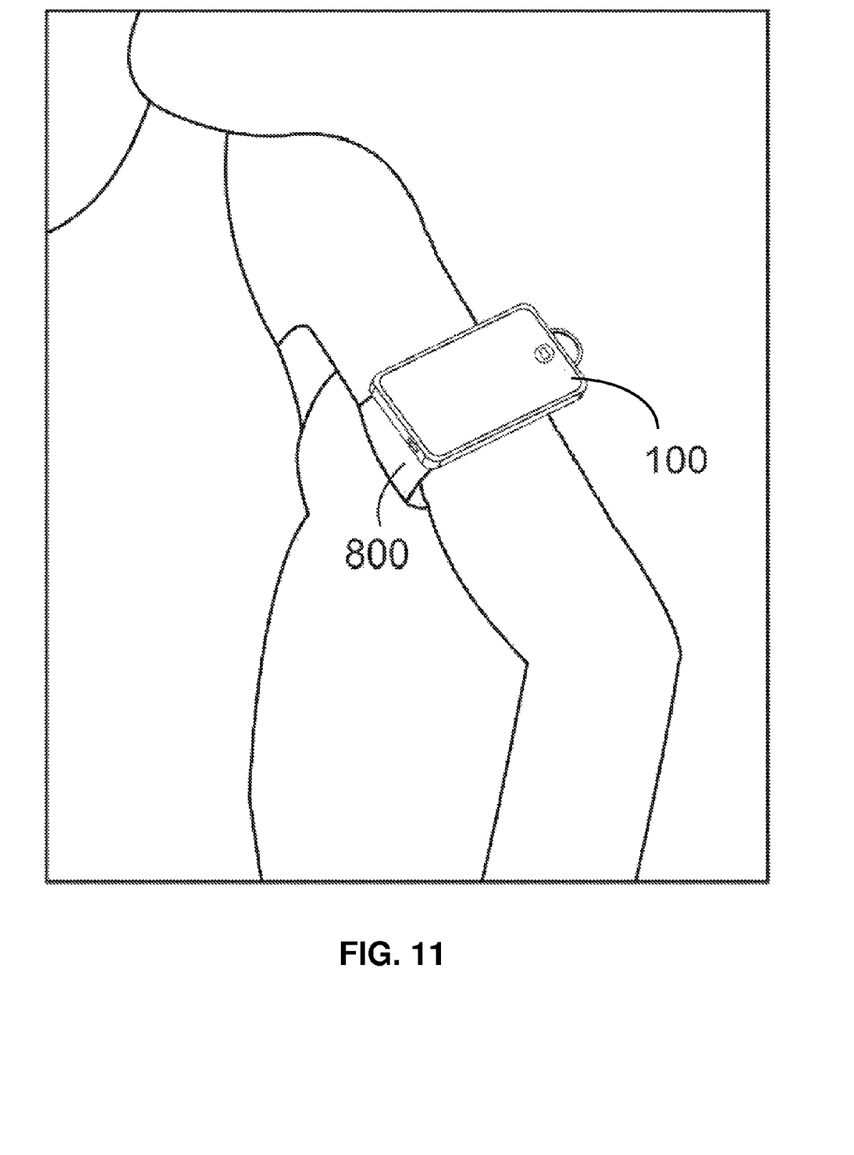
FIG. 11 illustrates the complementary attachment of the present invention connected to the user's arm.
Figure 12:
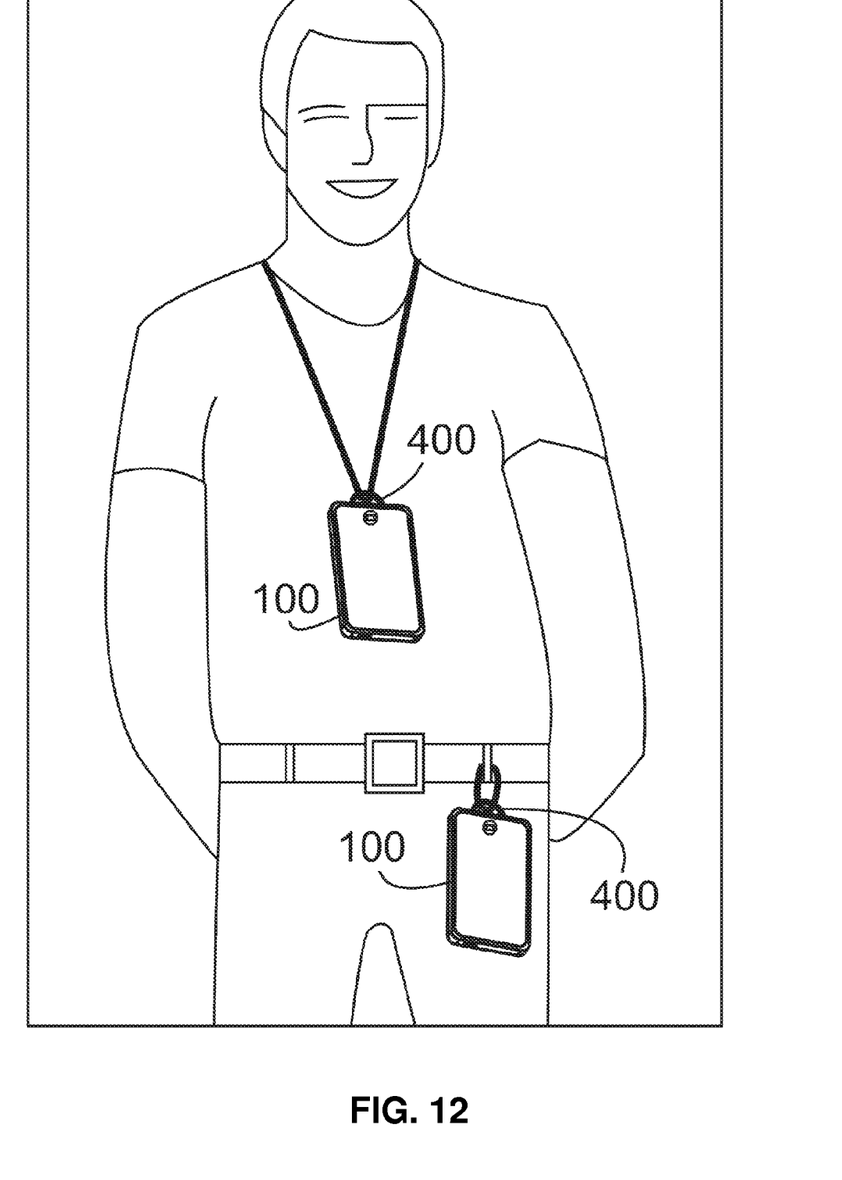
FIG. 12 illustrates the complementary attachment of the present invention connected to a strip for hanging on neck or hip of the user.

FIG. 10 and FIG. 11 illustrate the present invention attached on a user's wrist and arm, respectively.

The handler for mobile phone of the present invention may also include a ring 400 designed to receive a connecting means to connect the mobile device to the user's neck or hip. Said ring 400 is attached to the bottom of the case 100. Referring to FIG. 3 said ring is sewn or adhered under the second strip 300 of the case 100.

Figure 13:
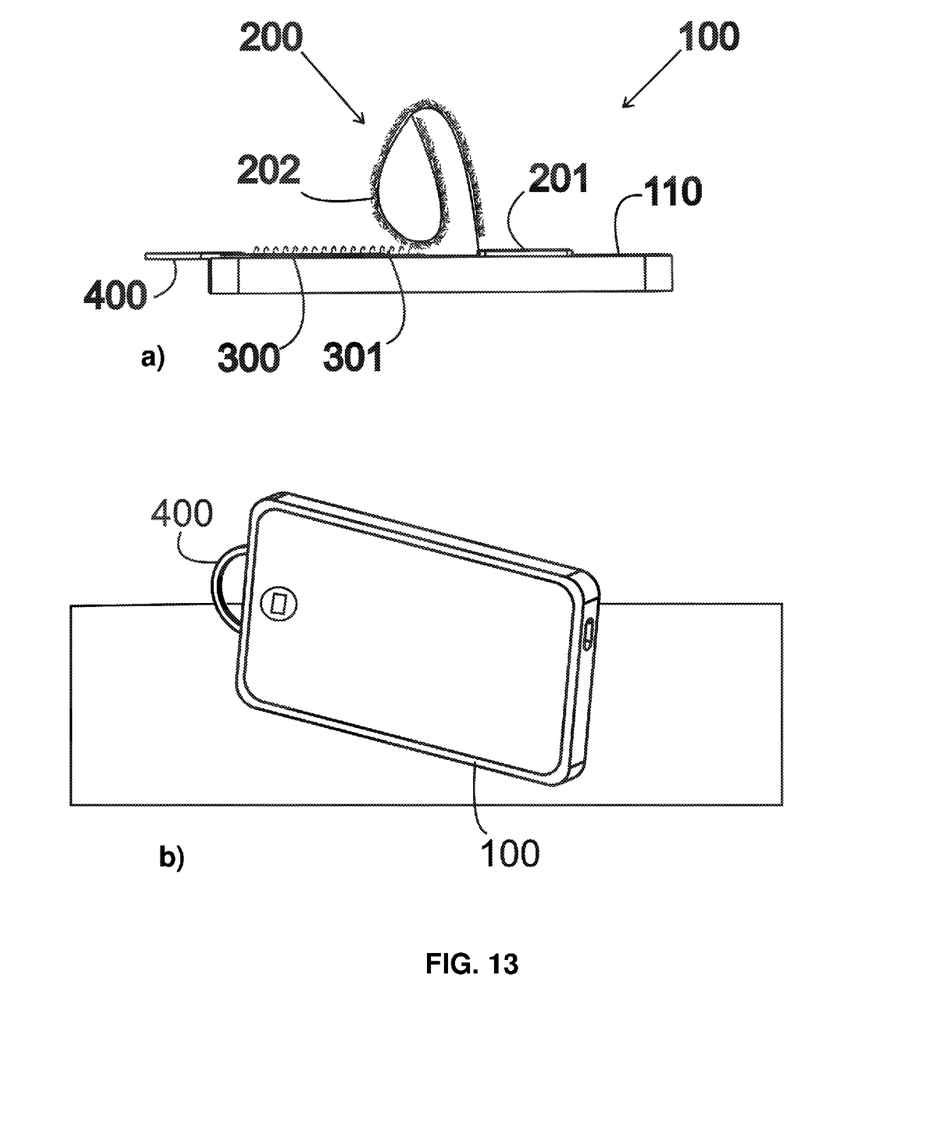

The first strip 200 having the ability to attach to the second strip 300 in various locations. As shown in FIG. 13 (a-b), FIG. 13 (a) is a side view of the handler of the mobile handheld device and how the sleeve part 202 attaches to the distal end 301 of the second strip 300 on the back of the mobile case 100. The first strip 200 builds a loop by attaching to the second strip and can be used as a mobile stand. FIG. 13 (b) shows the mobile case 100 standing on a surface by using the present invention.

Figure 14:
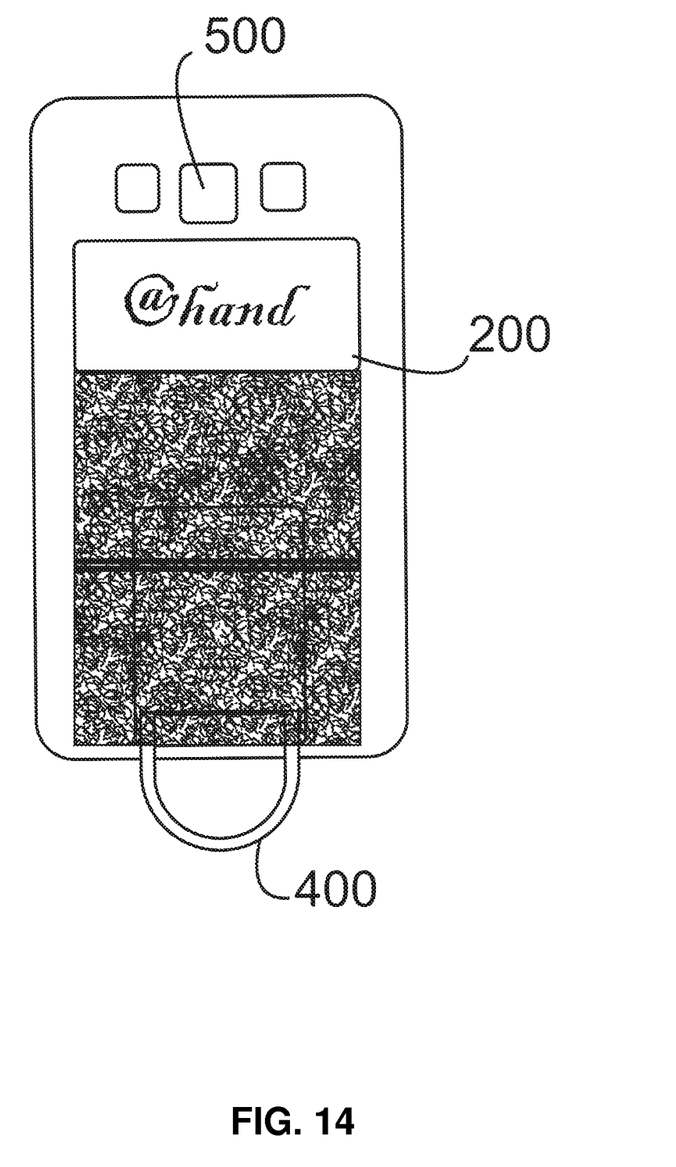
FIG. 14 illustrates the present invention having identification or advertisement thereon.

A useful aspect of the present invention is the ability to print logos onto the various parts of the handler device. Referring to FIG. 14 said strips are configured to have sufficient surface area to provide identification related items such as personal names, corporate logos, photos or other identification information. Said handler device is designed to store other personal information for example ID numbers and medical information, which can be useful for young and senior users.

The handler for electronic handheld device of the present invention may attach on any existing mobile cases or being custom made. The elastic strips may be selected of various colors and pattern Velcro's to match the color and model of the mobile case.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

With respect to the above description, it is to be realized that the optimum relationships for the parts of the invention in regard to size, shape, form, materials, function and manner of operation, assembly and use are deemed readily apparent and obvious to those skilled in the art, and all equivalent relationships to those illustrated in the drawings and described in the specification are intended to be encompassed by the present invention.

What is claimed is:

1. A handler for the attachment to the back side of a mobile phone or a mobile phone case, wherein said back side having an upper back side close to a camera apertures, and a lower back side, said handler comprising:
   a. a first-strip of elastic hook and loop material having a distal end, a proximal end, a top surface, a first-strip-length, and a back surface;
   b. said proximal end being attached to the upper back side of said a mobile phone or said a mobile phone case by an adhesive means or a sewing means;
   c. said distal end of said first-strip being free and having a finger sleeve to receive a user's finger, whereby said user's finger inserted in said finger sleeve can move in a three dimensional space independent of said mobile phone but limited to a distance equal to said first-strip-length from said phone; and
   d. a second strip of hook and loop material attached to the lower back side of said a mobile phone or said a mobile phone case, said second strip having a first end and a second end, and a second-strip-length defined by the first and second ends;
   e. said handler being made of a Velcro or similar materials, whereby, the free end of said first-strip enables the user to perform activities with other fingers with a safe grip, and whereby said finger sleeve may attach to any location along the second-strip-length of the second-strip allowing for holding the phone by one or more fingers and to form a stand for said mobile phone.

2. The handler for the attachment to the back side of a mobile phone or a mobile phone case of claim 1, further having a third-strip of elastic hook and loop material, wherein said third-strip of elastic hook and loop material strip, wherein said third-strip being attached to the second-strip and extending laterally on both sides of the mobile case for fastening said handler on the arm or the wrist of a user.

3. The handler for the attachment to the back side of a mobile phone or a mobile phone case of claim 2, wherein said third-strip having a length and a width sized to fit on a user's hand.

* * * * *